United States Patent [19]
Gulati

[11] Patent Number: 5,376,341
[45] Date of Patent: Dec. 27, 1994

[54] CATALYTIC CONVERTER FOR MOTORCYCLES

[75] Inventor: Suresh T. Gulati, Elmira, N.Y.

[73] Assignee: Corning Incorporated, Corning, N.Y.

[21] Appl. No.: 932,402

[22] Filed: Aug. 27, 1992

Related U.S. Application Data

[63] Continuation-in-part of Ser. No. 920,121, Jul. 24, 1992, abandoned.

[51] Int. Cl.$^5$ .................. B01D 50/00; B01D 53/34
[52] U.S. Cl. ...................... 422/179; 422/180; 55/321; 55/DIG. 30
[58] Field of Search ............... 422/170, 171, 172, 176, 422/177, 179, 180; 55/DIG. 30, 321

[56] References Cited

U.S. PATENT DOCUMENTS

| | | |
|---|---|---|
| 3,597,165 | 8/1971 | Keith et al. . |
| 4,206,177 | 6/1980 | Otsubo et al. ............ 422/171 |
| 4,209,493 | 6/1980 | Olson ........................ 422/176 |
| 4,353,873 | 10/1982 | Noritake et al. ........... 422/177 |
| 4,617,176 | 10/1986 | Merry . |
| 4,710,487 | 12/1987 | Koch . |
| 4,863,700 | 9/1989 | Ten Eyck . |
| 4,865,818 | 12/1989 | Merry et al. . |
| 4,925,634 | 5/1990 | Yokokoji et al. . |
| 4,929,429 | 5/1990 | Merry ........................ 422/179 |
| 4,999,168 | 3/1991 | Ten Eyck ................... 422/179 |
| 5,012,642 | 5/1991 | Laimböck ................... 422/176 |
| 5,065,576 | 11/1991 | Kanazawa et al. .......... 422/176 |
| 5,100,632 | 3/1992 | Dettling et al. ............ 423/213.5 |

FOREIGN PATENT DOCUMENTS

| | | | |
|---|---|---|---|
| 0411561 | 6/1991 | European Pat. Off. ........ 3/28 |
| 2635142 | 7/1989 | France ........................... 3/8 |

*Primary Examiner*—Robert J. Warden
*Assistant Examiner*—Krisanne M. Thornton
*Attorney, Agent, or Firm*—Robert L. Carlson

[57] ABSTRACT

A device suitable for use as a catalytic converter for the purification of exhaust gases from an internal combustion engine includes a ceramic monolith catalyst element resiliently mounted within a metallic housing. The metallic housing is in turn mounted within a hot gas chamber, such as an expansion chamber or muffler of a motorized vehicle. The ceramic monolith is wrapped with an insulating layer of inorganic ceramic fiber. At least one layer of intumescent material is disposed between the metallic housing and the inorganic fiber layer.

31 Claims, 4 Drawing Sheets

CATALYTIC CONVERTER FOR MOTORCYCLES

This application is a continuation-in-part of U.S. patent application Ser. No. 07/920,121, filed Jul. 24, 1992, now abandoned.

FIELD OF THE INVENTION

The present invention relates to a device for catalytic treatment of exhaust gases from a motorcycle internal combustion engine.

BACKGROUND OF THE INVENTION

Automobile and motorcycle exhaust gases are conventionally purified with a catalyst supported on a ceramic body able to withstand high temperatures. The preferred catalyst support structure is a honeycomb configuration which includes a multiplicity of unobstructed parallel channels sized to permit gas flow and bounded by thin ceramic walls. The channels may have any configuration and dimensions provided gases can freely pass through them without being plugged by entrained particulate material. Examples of such preferred structures include the thin-walled ceramic honeycomb structures described in U.S. Pat. No. 3,790,654 to Bagley and in U.S. Pat. No. 3,112,184 to Hollenbach.

Ceramic honeycomb catalyst supports are exposed to high temperatures resulting from contact with hot exhaust gases and from the catalytic oxidation of uncombusted hydrocarbons and carbon monoxide contained in the exhaust gas. In addition, such supports must withstand rapid temperature increases and decreases when the automobile engine is started and stopped. Such operating conditions require the ceramic honeycomb catalyst support to have a high thermal shock resistance, a property generally inversely proportional to the coefficient of thermal expansion.

Ceramic supports for catalytic converters are typically formed from brittle, fireproof materials such as aluminum oxide, silicon oxide, magnesium oxide, zirconium silicate, cordierite, or silicon carbide. The typical honeycomb configuration of supports made from these ceramic materials enables even very small mechanical stresses to cause cracking or crushing. In view of their brittleness, a great effort has been expended to develop catalytic converter housings, or cans, for such supports.

For example, U.S. Pat. No. 4,863,700 to Ten Eyck discloses a catalytic converter system wherein a frangible ceramic monolith catalyst is resiliently mounted in a metallic housing by an insulating layer of ceramic fibers wrapped around the monolith, and a layer of intumescent material disposed between the metal housing and the ceramic fiber layer.

In many applications, particularly those involving small engines, there is little room for mounting catalytic converters. Examples of such applications include chainsaws, lawnmowers, and motorcycles, particularly motorcycles having less than a 250 cc engine. One solution to this problem is to mount the catalytic converter within existing exhaust system components rather than providing an additional catalytic converter housing. One such location is inside a hot gas chamber. Conventional hot gas chambers include expansion chambers and mufflers, as will be discussed below, in which an exhaust pipe empties into a chamber housing with a larger cross-sectional area than the exhaust pipe. The larger cross-sectional area than the exhaust gases to expand and provides an area in which noise may be muffled.

When the catalytic converter is mounted within an expansion chamber or muffler of a motorcycle, the back pressure is substantially higher than that in an automotive converter. Due to the high back pressure, as well as the vibrational acceleration at high engine speeds, ceramic catalysts for such applications must be capable of withstanding relatively large axial forces to prevent movement in the can housing.

In addition, the high levels of carbon monoxide and hydrocarbons emitted by engine exhausts, particularly those of two-stroke motorcycles, such catalytic converters to endure extreme exotherms during pollutant oxidation. In motorcycles, this commonly results in a temperature increase from an average of 400° C. at the inlet of the converter to 900° C. at the outlet of the converter. Encapsulation within an insulated hot gas chamber such as a muffler prevents such converters from efficiently dissipating heat to the atmosphere. Furthermore, in such applications, the hot exhaust gas not only flows through the catalytic converters, but also around its housing. Consequently, in such applications the temperature of the catalytic converter housing assembly (i.e., the housing which maintains the converter in its correct position inside the hot gas chamber) commonly approaches 900° C. Many of the conventional intumescent insulating materials used to house catalytic converters contain vermiculite, which loses its chemically-bound water when exposed to such high temperatures. The loss of chemically-bound water damages the intumescent character of the mater so that it does not provide adequate mounting pressure to retain the ceramic catalyst support. This jeopardizes the ability of the ceramic catalyst to withstand axial and other forces resulting from exhaust gas flow and vehicle vibration.

U.S. Pat. No. 4,925,634 to Yokokoji, et al. discloses a catalytic converter for use with a car, motorcycle or the like. In one embodiment, the catalytic converter housing is surrounded by an insulating dead air space to prevent thermal damage to the outer tube of the muffler.

U.S. Pat. No. 3,597,165 to Keith et al. discloses a catalytic exhaust purification device including a housing within which is mounted four ceramic catalyst supports, each catalyst being surrounded by a single layer of insulation material. The exhaust gases are directed in a straight line through the catalytic converter, which is not an efficient design for absorbing sound.

U.S. Pat. No. 4,710,487 to Koch discloses a diesel exhaust gas catalyst in which exhaust gas in routed first around and then through a ceramic catalyst. The ceramic catalyst is embedded in a single layer of an embedding material and enclosed in a catalyst holder. No mentioned is made of wrapping the catalyst in an insulating mat.

The need thus continues for a catalytic converter which will remain securely mounted inside a hot gas chamber, even at operating temperatures exceeding 800° C.

SUMMARY OF THE INVENTION

The present invention relates to a ceramic support for treating exhaust gases, such as a catalytic converter or diesel particulate filter, wherein the support is mounted in a hot gas chamber and exhaust gas in the chamber substantially surrounds the support. The catalytic converter includes a ceramic honeycomb structure having gas flow passages extending between two opposite ends. The passages are defined by relatively thin walls encompassed within a peripheral wall extending between the ends. A housing surrounds and is spaced from the peripheral wall, the housing being mounted inside the hot gas chamber. A high temperature resistant inorganic fiber layer of low thermal conductivity is wrapped directly around the peripheral wall. One or more layers of an intumescent material is provided between the first inorganic fiber layer and the housing. Optionally, a second layer of inorganic insulating fiber material may be disposed between the intumescent material and the housing. The apparatus is useful in any hot gas chamber, and may be used in a variety of exhaust systems, such as those of automobiles, chainsaws, lawnmowers, etc. The apparatus is particularly useful in motorcycle exhaust systems, both 2-stroke and 4-stroke.

DETAILED DESCRIPTION OF THE DRAWINGS AND INVENTION

Figure 1:
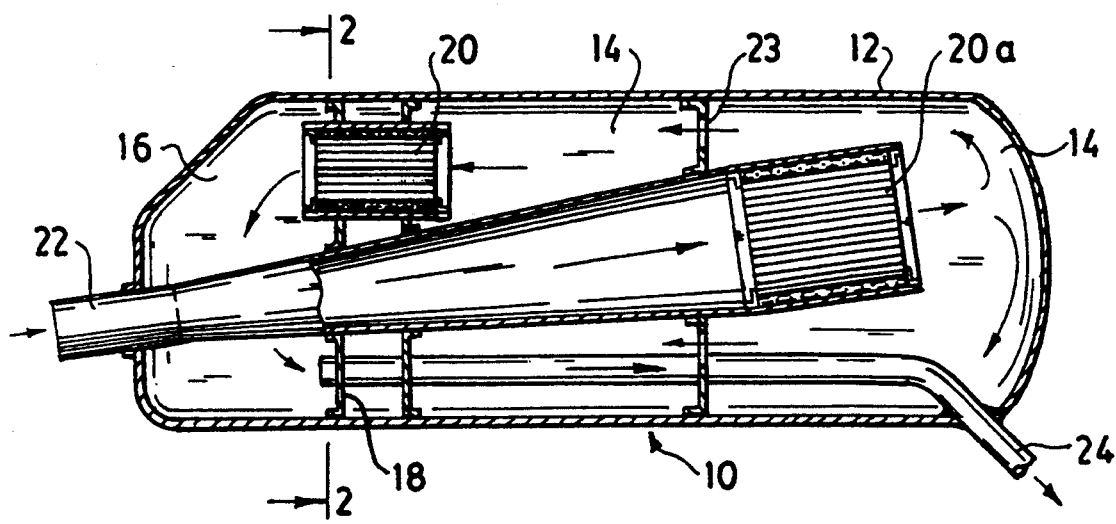
FIG. 1 is a side cross-sectional view of a hot gas chamber in accordance with the present invention.
Figure 2:
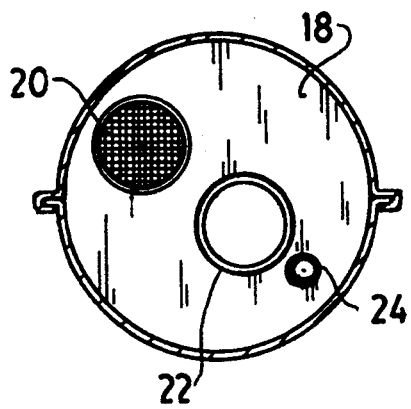
FIG. 2 is a front cross-sectional view of the hot gas chamber of FIG. 1 taken along line 2—2.

FIGS. 1 and 2 are a side cross-sectional view and front cross-sectional view, respectively, of a catalytic converter mounted within a hot gas chamber in accordance with the present invention. Hot gas chamber 10 is defined by outer metallic wall 12, and includes gas intake chamber 14 and gas exit chamber 16 which are separated by a dividing wall 18. Dividing wall 18 also serves to retain catalytic converter 20 within hot gas chamber 10. As illustrated in FIG. 1, a second catalytic converter housed at 20a may be located inside the exhaust pipe 22. The employment of two catalytic converters could be done, for example, to improve catalytic conversion efficiency, or to include a diesel particulate filter as one of the catalytic supports to trap and oxidize particulates from the exhaust gasses. Alternatively, in many applications, the hot gas chamber may be designed to utilize only one catalytic converter, in which case the converter can be located either inside the exhaust pipe, as at 20a, or outside the exhaust pipe, as at 20. Exhaust pipe 22, which preferably extends substantially into the hot gas chamber, transports exhaust gases from a combustion engine to intake chamber 14 of hot gas chamber 10. Support wall 23 in chamber 14 has cavities therein, through which gases are free to flow. Support wall 23 serves to support exhaust pipe 22 in its correct location. Tailpipe 24 communicates with exit chamber 15, to allow treated exhaust gases to escape from hot gas chamber 10. Exhaust pipe 22 preferably flares outwardly inside the hot gas chamber to allow for expansion of the exhaust gases. As shown in FIG. 1, exhaust pipe 22 extends through exit chamber 16 and dividing wall 18 to supply exhaust gas to intake chamber 14. Similarly, tailpipe 24 extends through intake chamber 14 and the dividing wall 18 to remove treated exhaust gas from exit chamber 16. As a result, in the hot gas chamber illustrated in FIGS. 1 and 2, exhaust gas from a combustion engine flows through the exhaust pipe 22 and through catalytic converter 20a. The gas then enters intake chamber 14 where it reverses direction substantially 180°, and, after flowing through an optional second support wall 23, passes through an optional second catalytic converter 20. This reversal in direction aids in muffling sound. After treatment in catalytic converter 20, the exhaust gas enters exit chamber 16, again reverses direction substantially 180°, and then exits chamber 14 and hot gas chamber 10 through tailpipe 24.

A hot gas chamber is basically a chamber having a larger cross-section than the exhaust pipe leading from the combustion engine so that the flow of gases undergo a pressure drop when they enter the chamber. By incorporating the catalytic honeycomb support inside a hot gas chamber, which preferably is a muffler and/or an expansion chamber, a number of advantages can be obtained. For example, by containing the ceramic support inside a muffler and/or expansion chamber, less space is taken up. The resultant space savings is important in products such as motorcycles, chain saws, etc. Furthermore, in many applications, catalytic honeycomb supports are capable of providing a significant amount of muffling to the exhaust gas. In such cases, even more space could be saved by decreasing the size of the muffler (hot gas chamber) itself.

Figure 3:
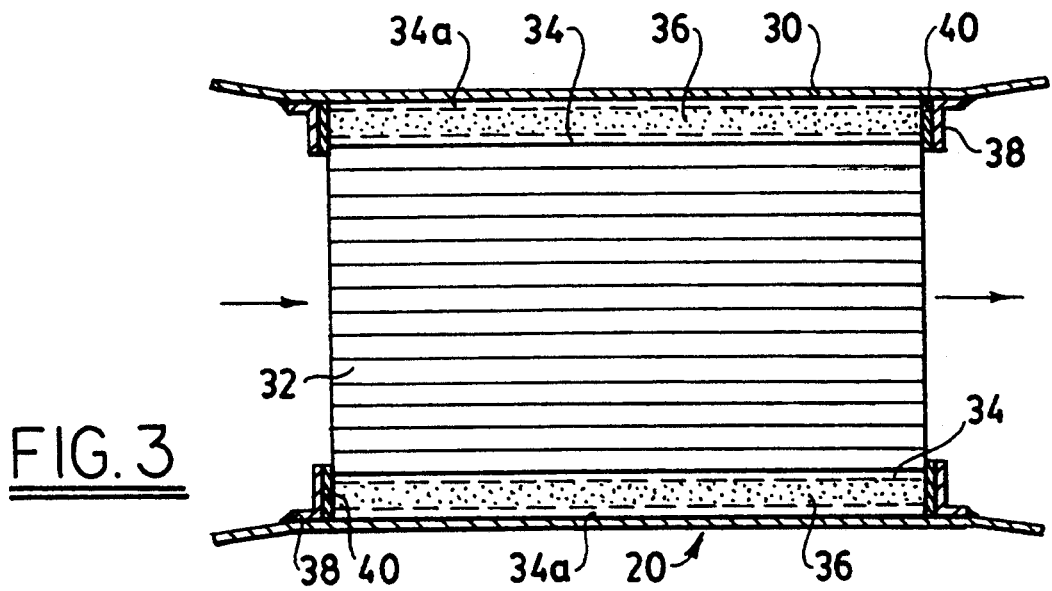
FIG. 3 is a side cross-sectional view of a catalytic converter of the present invention.

FIG. 3 is a side cross-sectional view of the catalytic converter 20 (and/or 20a) in accordance with the present invention. Catalytic converter 20 generally includes metallic can 30 within which ceramic honeycomb support 32 is radially secured by a multilayer of insulation material. The multilayer material includes at least one layer of high temperature resistant inorganic fiber layer 34 of low thermal conductivity wrapped directly around the outer periphery of ceramic honeycomb support 32, and a layer of intumescent material 36 between inorganic fiber layer 34 and can 30. Preferably, a second layer of inorganic fiber 34a is provided directly against the inside of can 30. This second inorganic layer 34a protects the intumescent layer 36 from exhaust gases which typically surround the converter when mounted inside a hot gas chamber. Ceramic honeycomb support 32 is preferably further retained within the can housing 30 by cylindrical end rings 38 which are welded or otherwise affixed to the interior of can 30. An annular ring of insulating material 40 preferably is located between end rings 38 and ceramic honeycomb support 32 to provide insulating between hot support 32 and end rings 38 and at the same time transmit a uniform axial mounting pressure via end rings 38 to ceramic honeycomb support 32. Preferably, the insulating material 40 also acts as a mechanical cushion between ceramic monolith 32 and the end rings 38. A preferred material for insulating material 40 is FEL-RAMIC 2000™, manufactured by Fel-Pro Incorporated of Skokie, Ill. FEL-RAMIC 2000™ is a high temperature gasket material with a graphite impregnated metal core and ceramic sheet cladding.

Cylindrical can housing 30 and end rings 38 are preferably made of stainless steel, which exhibits low thermal expansion, good corrosion resistance, and high temperature durability. In addition, stainless steel can be installed using pressure welding techniques. Consequently, positive axial and radial pressure can be applied during welding to further aid in withstanding engine vibrations and road shocks. For example, in a preferred embodiment of the invention, approximately 50 psi pressure is applied axially to end rings 38 against the support 32 during installation. Pressure welding of the can 30 may also be used to impart the desired installation density on the insulating layers 34 and 36. More preferably, however, the desired density is imparted during a preferred installation technique known as "stuffing", wherein the ceramic support wrapped in insulating is forced through a conical fixture (thereby compressing the insulation) and into the housing 30.

Ceramic honeycomb support 32 may be formed from any ceramic material conventionally used for this purpose such as is disclosed, for example in U.S. Pat. No. 3,885,977 or U.S. Pat. Reissue No. 27,747. The honeycomb support is typically treated with a catalyst containing washcoat prior to installation in can 30. The washcoat typically contains a refractory oxide, such as alumina or magnesia, and one or more catalyst elements, such as scandium, yttrium, etc. For a further explanation of washcoats, see, for example, U.S. Pat. No. 3,951,860. Diesel particulate filters, such as is disclosed in U.S. Pat. No. 4,329,162, may be utilized in place of the conventional ceramic supports 32 in one or more of the converters 20 or 20a to remove particulate material from the exhaust gas. Preferably, an extruded cordierite ceramic substrate having a high mechanical integrity, low resistance to gas flow, and a high geometric surface area is utilized as the support 32. One important parameter for the ceramic support is its mechanical integrity, in particular its radial strength. Typical cordierite honeycomb supports are capable of easily withstanding more than 4826.5 kPa (700 pounds per square inch) of radial pressure before noticeable damage to the honeycomb occurs.

Inorganic fiber layers 34 and 34a are preferably in the form of a ceramic fiber paper, ceramic fiber blanket, ceramic fiber mat, or ceramic fiber felt, and are capable of providing the necessary thermal insulation to protect the integrity of the intumescent material. The inorganic fiber layers 34 and 34a preferably also provide mechanical support for the ceramic honeycomb support 32 within can 30. Inorganic fiber material 34 and 34a preferably contains less than 30 percent vermiculite to achieve maximum insulating effect; more preferably, inorganic fiber layer 34 and 34a contains no vermiculite. A particularly preferred material for the inorganic fiber layer is Fiberfrax TM 970J paper available from Sohio Engineered Materials Company, Niagara Falls, N.Y. This product is made from bulk alumino-silicate glassy fiber having approximately 50—50 by weight alumina/silica and 70/30 by weight fiber/shot ratio. About 93 weight percent of this paper product is ceramic fiber/shot, and the remaining 7% is an organic latex binder. For particularly high monolith temperatures, alumina fibers, or papers produced from polycrystalline mullite ceramic fibers may be employed. Other materials which are useful in the inorganic fiber layer include those formed from basalt, alumino-silicates and chrome, zircon and calcium modified alumino-silicates and the like.

Intumescent material is an insulating material which expands upon heating. Preferably, the intumescent material contains vermiculite, which may be ion-exchanged, and which preferably has an uncompressed nominal density of about 0.56 to 0.69 kg/l (35 to 43 pcf). Vermiculite is known for its heat resistance and expandability upon heating.

The choice of installation densities for the insulating layers is dictated by the compression characteristics of the individual mats and the pressure needed to retain adequately ceramic support 32 inside the housing 30. The installation density must be capable of retaining the ceramic support while withstanding high temperature, vibrational loads and gas flow forces encountered through the normal life of a motorcycle.

For example, in one embodiment of the invention a layer of inorganic fiber material (Fiberfrax TM) having a density of 500 g/m$^2$ is wrapped directly around a ceramic honeycomb monolith. A first layer of vermiculite containing intumescent material, having a density of 1830 g/m$^2$ is wrapped around the inorganic fiber layer, and a second layer of intumescent material, having a density of about 3660 g/m$^2$ is wrapped around the first intumescent layer. These three layers are installed at a total density between about 0.94 and 1.26 g/cm$^3$. Mounting pressure is a measure of the resultant pressure of the insulating mat onto the catalyst converter, and is related to installation density, D, through the equation $$MP = 40,000 \, exp[-6.7/D]$$

Typical operating conditions for 50–150 cm$^3$ motorbike engines include a vibrational acceleration of about 10 g's (g=the acceleration due to gravity) during a vibrational displacement of about 0.0035 inch at about 167 Hz and a temperature exceeding 800° C. The minimum radial mounting pressure (i.e., the radial pressure provided by the insulation) needed to retain a ceramic honeycomb under these conditions is approximately 34.475 kPa (5 psi). More than adequate mounting pressure is obtained using the above mentioned installation density (220.6 to 7351.4 kPa for an installation density of 0.94 to 1.26 g/cm$^3$) and yet the pressures on the converter resulting from these densities would still be approximately 1/5th the minimum radial strength of the converter. Any added pressure contributes to the mechanical integrity and long-term durability of the hot gas chamber/catalytic converter combination of the present invention.

Consequently, for a motorcycle engine operating under the above described operating conditions, the inorganic fiber layers 34 and 34a and intumescent layers 36 are preferably capable of maintaining the axial position of the ceramic support while the converter is exposed to an axial pressure of 1723.75 kPa (250 psi) at 700° C., 689.5 kPa (100 psi) at 800° C. (more preferably 1379 kPa (200 psi) at 800° C.), 172.4 kPa (25 psi) at 900° C., and 34.5 kPa (5 psi) at 1000° C. As mentioned above, when exposed to such high temperatures, vermiculite loses its chemically-bound water which gives it intumescent properties. Consequently, since, in the present invention, the hot gases leaving the housing 20 will thereafter, in most cases, substantially surround the housing 20 inside the hot gas chamber, a second layer of inorganic fiber material 34a is provided aroung the intumescent layers 36.

Figure 4:
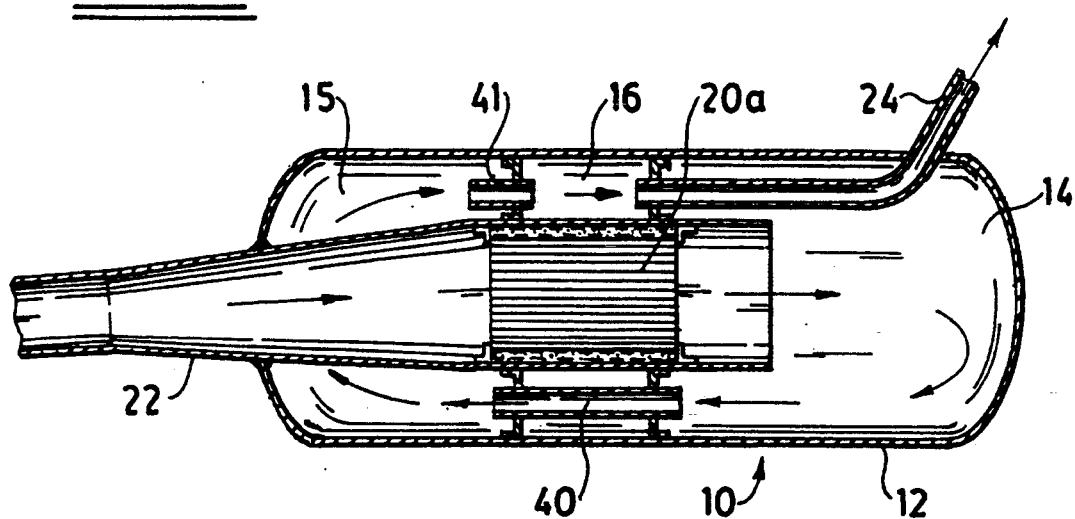
FIG. 4 is a side cross-sectional view of an alternative hot gas chamber in accordance with the present invention.
Figure 5:
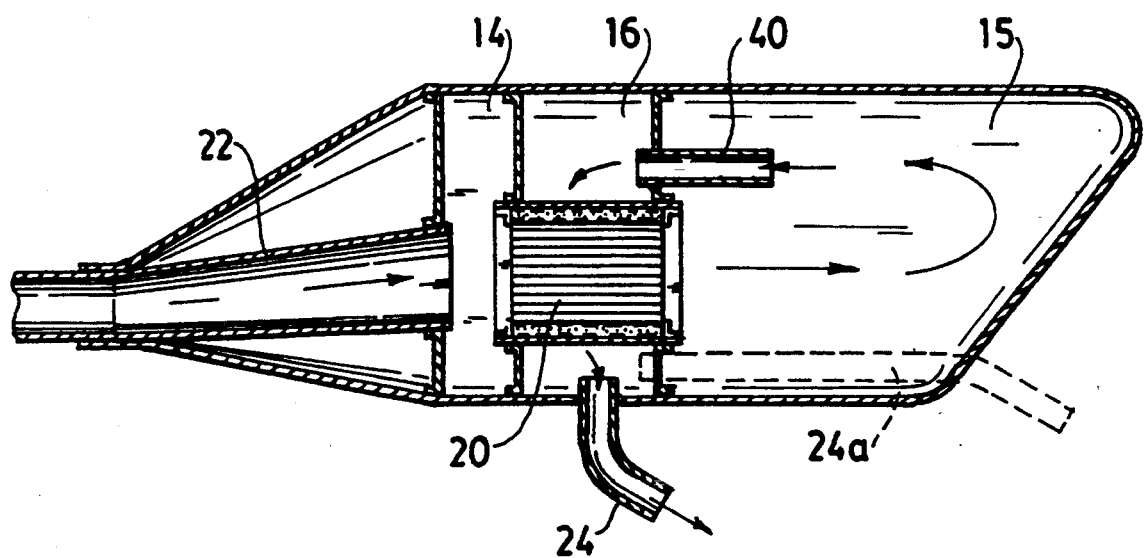
FIG. 5 is a side cross-sectional view of an alternative hot gas chamber in accordance with the present invention.

FIGS. 4 and 5 are side cross-sectional views of alternative embodiments of hot gas chambers in accordance with the present invention. Referring first to FIG. 4, exhaust from a combustion engine is transferred into the hot gas chamber through exhaust pipe 22, which has a catalytic converter assembly 20a located therein. After passing through the catalytic converter 20a, the treated gases are directed into intake chamber 14 where they reverse direction substantially 180° and are forced out of chamber 14 through connecting pipe 40 and into mid-chamber 15. In mid-chamber 15, the gases again reverse direction substantially 180°, and exit through connecting pipe 41 into exit chamber 16. The treated gases are then forced through tailpipe 24 out of exit chamber 16 and hot gas chamber 10. Tailpipe 24 and connecting pipe 41 are preferably not in line with one another in order to mix exhaust gases further in chamber 16 and thereby aid in muffling. As illustrated in FIG. 4, the portion of the exhaust pipe 22 which houses the converter assembly 20 is preferably of a cylindrical shape, to facilitate location of a conventional cylindrical catalytic converter assembly therein. However, it is conceivable that catalytic converters having a frusto-conical, oval, or other cross-sectional shape outer periphery could be utilized, in which case the exhaust pipe 22 could be shaped to match the converter.

The pressure drop across a 1" length of catalytic converter is 3 to 4 times higher at 800° C. than at 25° C. Consequently, for some motorcycle engines, such as 150 cc or more, which can run at up to 10,000 rpm, the flow velocity through a 55 mm (2.6 in.) diameter×45 mm (1.77 in.) long converter is approximately 37 m/sec (1450 in/sec) (with a corresponding pressure drop across the converter of 7.84 kPa (31.5 inches $H_2O$). This is approximately twice the pressure drop of an average passenger car converter. However, increasing the converter diameter from 55 mm (2.16 in.) to 76.4 mm (3 in.), for example, can reduce the pressure drop by 50% without sacrificing other performance parameters. Thus, by increasing converter size, the back pressure can be minimized and other performance parameters such as conversion efficiency, etc., can be improved. By locating the catalytic converter substantially in the axial center of the hot gas chamber, such as at 20a in FIG. 4, a converter having a larger cross-sectional area may be employed.

Referring now to FIG. 5, another embodiment of hot gas chamber in accordance with the present invention is illustrated. In FIG. 5, the intake chamber 14 is located to the front of the hot gas chamber, that is, the end closest to the incoming exhaust gas. After flowing into intake chamber 14, the exhaust gases flow through catalytic converter assembly 20 and into mid-chamber 15. In mid-chamber 15, the exhaust gases reverse direction substantially 180° and exit mid-chamber 15 through connecting tube 40 and into exit chamber 16. In exit chamber 16, the exhaust gases again reverse direction and exit through tailpipe 24 and out of the hot gas chamber. Alternatively, the tailpipe could be positioned to transport the gas through mid-chamber 15 and emit the gas at the rear of the hot gas chamber, as illustrated in phantom at 24a.

The invention may be more easily comprehended by reference to a specific example. It must be understood, however, that this example is provided only for purposes of illustration, and that the invention may be practiced otherwise than as specifically illustrated without departing from its spirit and scope.

EXAMPLE

A cordierite honeycomb converter was washcoated with a water base slurry of $Al_2O_3$ and mounted inside a stainless steel housing with the following insulating mats between the cordierite honeycomb converter and the housing. A layer of FIBERFRAX ™ having an uninstalled density of 500 g/m² was glued to a layer of XPE2035 ™ mat, a vermiculite containing intumescent material having an uninstalled density of 2035 g/m². This two component mat was wrapped around a washcoated honeycomb support, with the inorganic fiber layer directly in contact with the outer periphery of the support. A layer of XPE3100 ™, a vermiculite-containing intumescent material having an uninstalled density of 3100 g/m², was then wrapped around the two component layer. Both the FIBERFRAX ™ and XPE ™ materials were manufactured by Sohio Engineered Materials Company, Niagara Falls, N.Y. The insulated honeycomb was then housed within a stainless steel can housing. The three insulating layers were installed at a total insulating mat density between 0.88 and 1.18 g/cm³.

Figure 6:
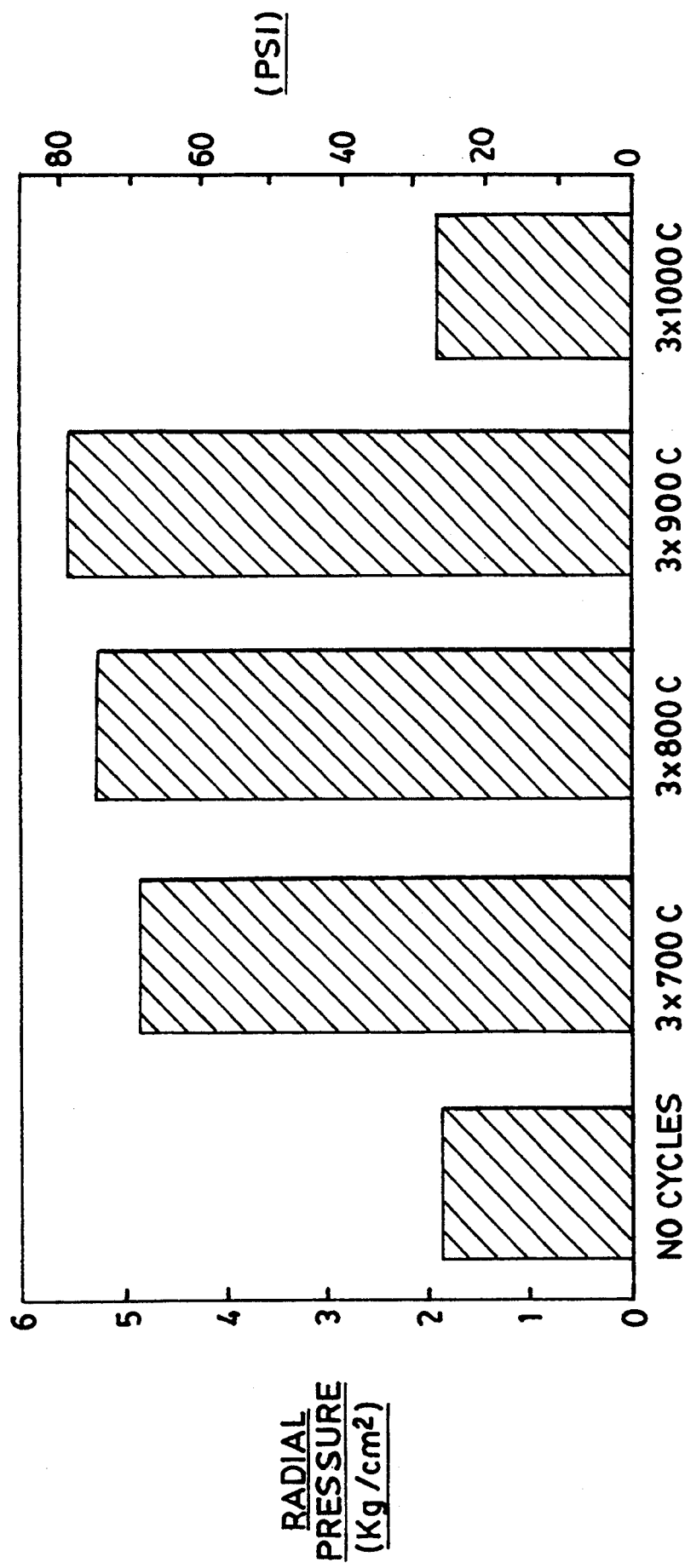
FIG. 6 is a graph, illustrating the room temperature axial retention test results for a catalytic converter in accordance with the present invention.

A series of axial retention tests were conducted on various catalytic converters having the above construction. No end rings were used to axially support the ceramic honeycomb in the converter assemblies during the retention tests. Consequently, the ceramic support was retained in position only by the radial compressive forces of the insulating mat layers, namely, the inorganic fiber layer and the intumescent layers. The axial retention test involved first retaining the outer periphery of the housing. A piston attached to a pressure gauge then exerted an increasing force against the ceramic support (parallel to the direction of air flow) until the support moved. For a control, one converter was given an axial retention test at room temperature. Each of the other four converters were cycled three times at different temperatures, namely, 700° C., 800° C., 900° C., and 1000° C., prior to being tested for axial retention at room temperature. After being cycled three times at high temperature, each test converter was allowed to cool to room temperature, at which time an axial retention test was conducted until it was observed that the ceramic support began to move in the can. The pressure needed to move the ceramic support was then recorded. The results, illustrated in FIG. 6, show that the axial retention load needed to dislodge the ceramic support actually increased after cycling at 700° C. and returning to room temperature, and further increased as the cycling temperature increased to 900° C. This indicates that, using the above-described converter assembly, the thickness and density of the inorganic fiber layer was sufficient to protect the intumescent layer. Further, the results demonstrate that the retention pressure achieved is not only adequate to maintain the converter in its appropriate position during exposure to temperatures greater than 1000° C., it is able to do so without the use of end rings.

Figure 7:
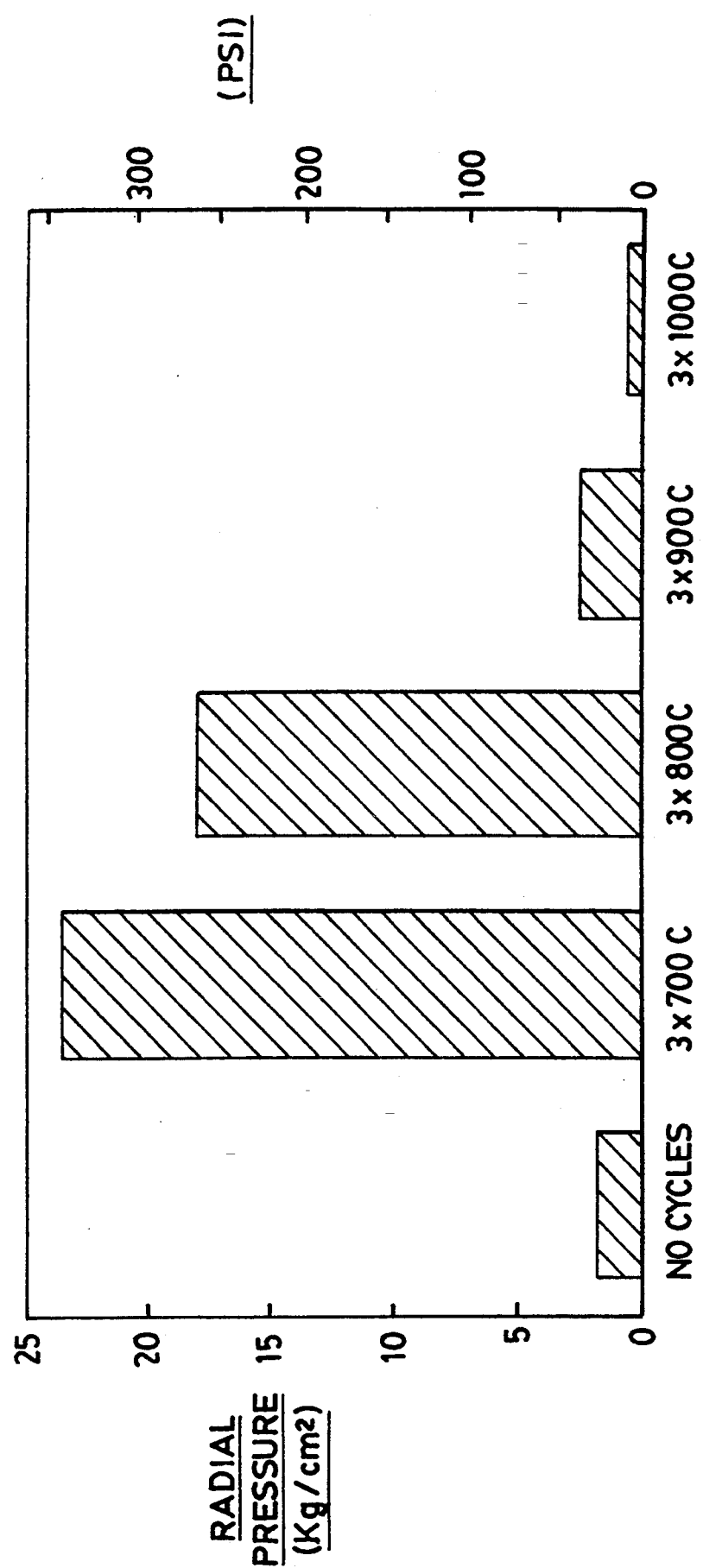
FIG. 7 is a graph, illustrating the high temperature axial retention test results for a catalytic converter in accordance with the present invention.

A series of axial retention tests were also conducted while the converters were still at high temperature. FIG. 7 illustrates the results of the high temperature axial retention tests, which were similar to the retention tests discussed above in respect of FIG. 6, except that the retention tests were conducted while the converter was still at high temperature rather than room temperature. The results of the test indicate that the axial retention of the cordierite support inside the can again increased as the temperature increased to 700° C., then gradually decreased as temperature increased further to 800° C., 900° C., and 1000° C. Note that, even at 1000° C., the axial retention of the insulation was sufficient to easily survive inside the hot gas chamber of a motorcycle.

A 100 hour vibration test using a hydraulic actuator (Model No. 244.11 from Materials Testing Systems, with a 37.854 liter/min (10 gallon per minute) servovalve was conducted on a converter constructed in accordance with the above example. The converter was constructed as described above, except that end rings were installed on the interior of the can housing. An insulating gasket of FEL-RAMIC 2000 TM was disposed between the support and the end ring. As an axial pressure of 344.8 kPa (50 psi) was applied to the end ring against the ceramic supports, the end rings were spot welded to the interior of the can. The converter was vibrated back and forth at a frequency of about 150 Hz, with a peak-to-peak vertical displacement of approximately 0.44 mm (0.0174 inch), and a vibrational acceleration of about 40 g's peak-to-peak. A propane/air burner was simultaneously directed through the ceramic support to simulate combustion engine exhaust gas. The propane/air ratio and the blower speed were adjusted to achieve the desired temperature of 850° C. and flow rate through the converter of about 4000 liters per minute. The relative movement of the ceramic substrate was measured using a depth micrometer before testing and after operating for 20 hours and 100 hours. The relative displacement of the catalytic support measured both after 20-hours and 100 hours was less than the accuracy of the measurement device. Thus, the converter assembly easily passed the 100-hour test, illustrating that the converter design provides more than adequate mounting pressure to prevent relative motion between the substrate and housing during the above described combustion engine parameters.

The invention has been discussed in detail with particular reference to preferred embodiments thereof, but it will be understood that variations and modifications can be effected within the spirit and scope of the invention.

What is claimed is:

1. An apparatus for treating exhaust gases comprising:
   a hot gas chamber defined by an outer peripheral wall;
   an exhaust pipe extending substantially into said hot gas chamber; and
   at least one support mounted within the chamber such that exhaust gas in the chamber substantially surrounds the support, said support comprising:
   a ceramic honeycomb structure having gas flow passages extending between two opposite ends wherein the passages are defined by walls encompassed within a honeycomb peripheral wall extending between the ends,
   a housing surrounding and spaced from the honeycomb peripheral wall,
   a first inorganic fiber layer around the honeycomb peripheral wall, and
   at least one layer of intumescent material between the first inorganic fiber layer and the housing.

2. The apparatus of claim 1, wherein said hot gas chamber comprises an expansion chamber.

3. The apparatus of claim 1, wherein said hot gas chamber comprises a muffler.

4. The apparatus of claim 1, wherein said first inorganic fiber layer is selected from the group consisting of ceramic fiber mat, ceramic fiber blanket, ceramic fiber felt or ceramic fiber paper.

5. The apparatus of claim 1, wherein said first inorganic fiber layer contains less than 30 percent vermiculite.

6. The apparatus of claim 5, wherein the at least one intumescent layer contains ion-exchanged vermiculite and the first inorganic fiber layer limits the average temperature of the at least one intumescent layer to not more than 750° C. during continuous treatment of exhaust gases.

7. The apparatus of claim 1, wherein the first inorganic fiber layer and at least one intumescent layer are installed at a density which is sufficient to substantially maintain the axial position of the ceramic honeycomb of said at least one support while said honeycomb is exposed to an axial pressure applied parallel to said peripheral wall of at least 34.5 kPa (5 psi).

8. The apparatus of claim 1, wherein the first inorganic fiber layer and at least one intumescent layer are installed at a density which is sufficient to substantially maintain the axial position of the ceramic honeycomb of said at least one support while said honeycomb is exposed to an axial pressure applied parallel to said peripheral wall of 1723.8 kPa (250 psi) at 700° C.

9. The apparatus of claim 1, wherein the first inorganic fiber layer and at least one intumescent layer are installed at a density which is sufficient to substantially maintain the axial position of the ceramic honeycomb of said at least one support while said honeycomb is exposed to an axial pressure applied parallel to said peripheral wall of at least 689.5 kPa (100 psi) at 800° C.

10. The apparatus of claim 1, wherein the first inorganic fiber layer and at least one intumescent layer are installed at a density which is sufficient to substantially maintain the axial position of the ceramic honeycomb of said at least one support while said honeycomb is exposed to an axial pressure applied parallel to said peripheral wall of at least 1379 kPa (200 psi) at 800° C.

11. The apparatus of claim 1, wherein the first inorganic fiber layer and at least one intumescent layer are installed at a density which is sufficient to substantially maintain the axial position of the ceramic honeycomb of said at least one support while said honeycomb is exposed to an axial pressure applied parallel to said peripheral wall of at least 172.4 kPa (25 psi) at 900° C.

12. The apparatus of claim 1, wherein the first inorganic fiber layer and at least one intumescent layer are installed at a density which is sufficient to substantially maintain the axial position of the ceramic honeycomb of said at least one support while said honeycomb is exposed to an axial pressure applied parallel to said peripheral wall of at least 34.5 kPa (5 psi) at 1000° C.

13. The apparatus of claim 1, wherein said first inorganic fiber layer is vermiculite-free ceramic fiber paper.

14. The apparatus of claim 1, wherein said first inorganic fiber layer and at least one of said at least one intumescent layers are incorporated into a single composite material.

15. The apparatus of claim 1, wherein said at least one intumescent layer has an uncompressed nominal density of about 0.56 to 0.69 kg/l (35 to 43 pounds per cubic foot).

16. A motorcycle having an exhaust system provided with the apparatus of claim 2.

17. A motorcycle having an exhaust system provided with the apparatus of claim 3.

18. The motorcycle of claim 16, wherein the exhaust system is connected to a 2-cycle engine.

19. The apparatus of claim 1, further comprising:
a second inorganic fiber layer between said at least one layer of intumescent material and said housing.

20. The apparatus of claim 18, further comprising:
a second inorganic fiber layer between said at least one layer of intumescent material and said housing.

21. The apparatus of claim 20, wherein at least one of said at least one support is housed inside said exhaust pipe.

22. The apparatus of claim 1, wherein said at least one support is axially retained inside the housing by an end ring attached to the inside of said housing, said end ring comprising an annular surface in spaced relation with said at least one support, said first inorganic fiber layer and said first intumescent layer.

23. The apparatus of claim 22, further including an annular insulating gasket disposed between said end ring and said at least one support and layers.

24. The apparatus of claim 1, wherein one of said at least one support is a diesel particulate filter.

25. The apparatus of claim 1, wherein one of said at least one support is located substantially at the axial center of said hot gas chamber.

26. The apparatus of claim 1, wherein one of said at least one support comprises a catalytic converter.

27. The apparatus of claim 1, wherein said housing has an outer wall opposite said first inorganic fiber layer, and said exhaust gas flows around at least a portion of said outer wall.

28. A motorcycle having an exhaust system comprising:
a hot gas chamber; and
at least one support mounted within the chamber such that exhaust gas in the chamber substantially surrounds the supports, said support comprising:
a ceramic honeycomb structure having gas flow passages extending between two opposite ends wherein the passages are defined by walls encompassed within a peripheral wall extending between the ends,
a housing surrounding and spaced from the peripheral wall,
a first inorganic fiber layer around the peripheral wall,
at least one layer of intumescent material between the first inorganic fiber layer and the housing, and
a second inorganic fiber layer between said at least one layer of instrument material and said housing.

29. A motorcycle having an exhaust system connected to a two-cycle engine, said exhaust system being provided with an apparatus for treating exhaust gases, said apparatus comprising;
an expansion chamber; and
at least one support mounted within the chamber such that exhaust gas in the chamber substantially surrounds the support, said support comprising:
a ceramic honeycomb structure having gas flow passages extending between two opposite ends wherein the passages are defined by walls encompassed within a peripheral wall extending between the ends,
a housing surrounding and spaced from the peripheral wall,
a first inorganic fiber layer around the peripheral wall,
at least one layer of intumescent material between the first inorganic fiber layer and the housing, and
a second inorganic fiber layer between said at least one layer of instrument material and said housing.

30. An apparatus for treating exhaust gases comprising:
a hot gas chamber;
at least one support mounted within the chamber such that exhaust gas in the chamber substantially surrounds the support, said support comprising:
a ceramic honeycomb diesel particulate filter having gas flow passages extending between two opposite ends wherein the passages are defined by walls encompassed within a peripheral wall extending between the ends,
a housing surrounding and spaced from the peripheral wall,
a first inorganic fiber layer around the peripheral wall, and
at least one layer of intumescent material between the first inorganic fiber layer and the housing.

31. The apparatus of claim 1, wherein said support is mounted inside said exhaust pipe.

* * * * *

UNITED STATES PATENT AND TRADEMARK OFFICE
CERTIFICATE OF CORRECTION

PATENT NO. : 5,376,341
DATED : December 27, 1994
INVENTOR(S) : SURESH GULATI

It is certified that error appears in the above-indentified patent and that said Letters Patent is hereby corrected as shown below:

COLUMN 2, line 32 "mater" should be "mat"

COLUMN 3, line 68 "chamber 15" should be " chamber 16"

Signed and Sealed this

Sixteenth Day of May, 1995

Attest:

BRUCE LEHMAN

Attesting Officer     Commissioner of Patents and Trademarks